United States Patent
Mishra et al.

(10) Patent No.: US 12,506,674 B2
(45) Date of Patent: Dec. 23, 2025

(54) MULTICAST TRACING IN HYBRID NETWORKS

(71) Applicant: Cisco Technology, Inc., San Jose, CA (US)

(72) Inventors: Mankamana Prasad Mishra, San Jose, CA (US); Anuj Budhiraja, San Jose, CA (US); Sridhar Santhanam, Dublin, CA (US); Vinish Ramachandran, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 436 days.

(21) Appl. No.: 18/146,852

(22) Filed: Dec. 27, 2022

(65) Prior Publication Data

US 2024/0214292 A1 Jun. 27, 2024

(51) Int. Cl.
*H04L 43/10* (2022.01)
*H04L 45/50* (2022.01)

(52) U.S. Cl.
CPC .............. *H04L 43/10* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 7,016,351 | B1 * | 3/2006 | Farinacci | H04L 45/16 370/312 |
| 8,339,973 | B1 * | 12/2012 | Pichumani | H04L 43/10 370/248 |
| 12,335,133 | B2 * | 6/2025 | Mishra | H04L 45/16 |
| 2012/0033667 | A1 * | 2/2012 | Venkataraman | H04L 45/16 370/390 |
| 2012/0051231 | A1 * | 3/2012 | Ou | H04L 12/18 370/248 |
| 2019/0028354 | A1 | 1/2019 | Steinhauer | |
| 2020/0220742 | A1 * | 7/2020 | Zhang | H04L 43/0811 |
| 2021/0320837 | A1 | 10/2021 | Nandy et al. | |

FOREIGN PATENT DOCUMENTS

WO 2021233524 11/2021

\* cited by examiner

*Primary Examiner* — Xavier S Wong
(74) *Attorney, Agent, or Firm* — Polsinelli P.C.

(57) ABSTRACT

Disclosed are systems, apparatuses, methods, and computer-readable media for tracing multicast paths in hybrid networks. A method for tracing multicast paths in hybrid networks includes intercepting, by an edge device, a first multicast trace request transmitted by a first network device that a source device is connected to for tracing a route between the source device to a receiver device, wherein the first network device receives a message from a multicast tracing client to trace a multicast path from the receiver device to the source device; generating a second multicast trace request based on the format for the core network using information from the first multicast trace request; and transmitting the second multicast trace request from an edge network device to the receiver device using the core network, the second multicast trace request including network information related to network performance between the first network device and the edge network device.

20 Claims, 9 Drawing Sheets

MULTICAST TRACING IN HYBRID NETWORKS

TECHNICAL FIELD

The invention relates generally to communication networks and, more specifically but not exclusively, to tracing multicast paths in hybrid networks.

DESCRIPTION OF THE RELATED TECHNOLOGY

In Internet Protocol (IP) multicast networks, the multicast trace (mtrace) tool is used to trace the path that IP multicast packets take from a source to a destination. The mtrace tool is specified by an Internet Engineering Task Force (IETF) standard ("Mtrace Version 2: Traceroute Facility for IP Multicast," http://tools.ietf.org/html/draft-ietf-mboned-mtrace-v2-07) which allows the tracing of IP multicast routing paths, to trace the path that an IP multicast packet would take from some source to some destination. Multiprotocol Label Switching (MPLS) is used Service Provider Networks for transporting multicast applications over MPLS Label Switched Paths (LSPs) using Point-To-Multipoint (P2MP) LSPs, which are established using Resource Reservation Protocol (RSVP) signaling.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
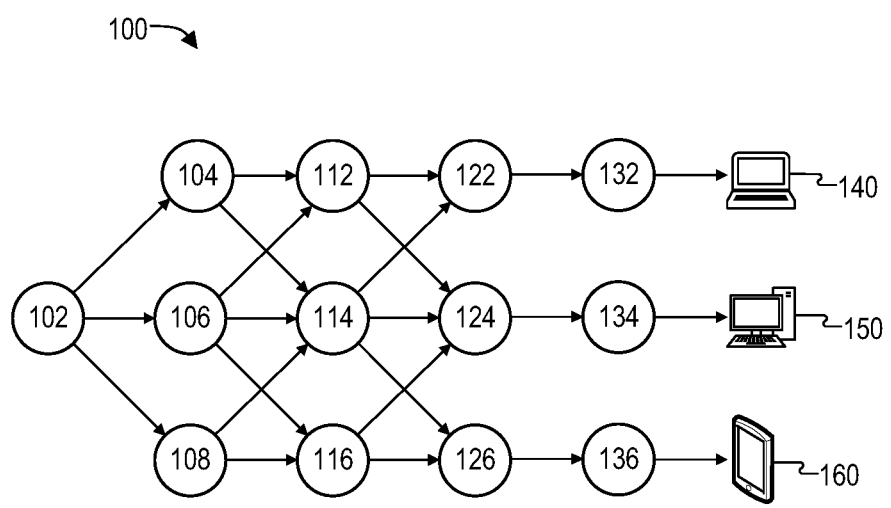
FIG. 1 illustrates an example of a multicast network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In some examples, systems and techniques are described for multicast tracing in hybrid networks.

Disclosed are systems, apparatuses, methods, computer readable medium, and circuits for tracing multicast routes.

According to at least one example, a method includes: Intercepting a first multicast trace request transmitted by a first network device that a source device is connected to for tracing a route between the source device to a receiver device, wherein the first network device receives a message from a multicast tracing client to trace a multicast path from the receiver device to the source device; generating a second multicast trace request based on the format for the core network using information from the first multicast trace request; and transmitting the second multicast trace request from an edge network device to the receiver device using the core network, the second multicast trace request including network information related to network performance between the first network device and the edge network device. For example, the ingress edge network device intercepts a first multicast trace request transmitted by a first network device that a source device is connected to for tracing a route between the source device to a receiver device, wherein the first network device receives a message from a multicast tracing client to trace a multicast path from the receiver device to the source device; generates a second multicast trace request based on the format for the core network using information from the first multicast trace request; and transmits the second multicast trace request from an edge network device to the receiver device using the core network, the second multicast trace request including network information related to network performance between the first network device and the edge network device.

In another example, a ingress edge network device for tracing multicast routes is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the ingress edge network device to: intercept a first multicast trace request transmitted by a first network device that a source device is connected to for tracing a route between the source device to a receiver device, wherein the first network device receives a message from a multicast tracing client to trace a multicast path from the receiver device to the source device; generate a second multicast trace request based on the format for the core network using information from the first multicast trace request; and transmit the second multicast trace request from an edge network device to the receiver device using the core network, the second multicast trace request including network information related to network performance between the first network device and the edge network device.

Disclosed are systems, apparatuses, methods, computer readable medium, and circuits for tracing multicast routes. According to at least one example, a method includes: intercepting a first multicast trace request from a core network at a second edge network device, wherein the first multicast trace request includes network information that is populated by network devices within the core network and network devices between a first network device a first edge network device, and wherein the first network device receives a message from a multicast tracing client to trace a multicast path from a receiver device to a source device; determining whether to remove network information that is populated by network devices within the core network; generating a second multicast trace request based on the format for the network including the last network device and using information from the first multicast trace request; and sending the second multicast trace request to the receiver device for tracing the route between the receiver device to the source device. For example, the egress edge network device intercepts a first multicast trace request from a core network at a second edge network device, wherein the first multicast trace request includes network information that is populated by network devices within the core network and network devices between a first network device a first edge network device, and wherein the first network device receives a message from a multicast tracing client to trace a multicast path from a receiver device to a source device; determines whether to remove network information that is populated by network devices within the core network; generates a second multicast trace request based on the format for the network including the last network device and using information from the first multicast trace request; and sends the second multicast trace request to the receiver device for tracing the route between the receiver device to the source device.

In another example, an egress edge network device for tracing multicast routes is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the egress edge network device to: intercept a first multicast trace request from a core network at a second edge network device, wherein the first multicast trace request includes network information that is populated by network devices within the core network and network devices between a first network device a first edge network device, and wherein the first network device receives a message from a multicast tracing client to trace a multicast path from a receiver device to a source device; determine whether to remove network information that is populated by network devices within the core network; generate a second multicast trace request based on the format for the network including the last network device and using information from the first multicast trace request; and send the second multicast trace request to the receiver device for tracing the route between the receiver device to the source device.

A multicast trace (mtrace) can be used by a multicast virtual private network (mVPN) to trace routes by using a provider multicast service interface (PMSI) tunnel attribute. The PMSI tunnel attribute can be added by network providers and allow converting of an mtrace request into a downstream request and sending the converted mtrace request over the PMSI tunnel. However, the PMSI tunnel attribute does not include aggregation of responses at a first hop router, nor does the PMSI tunnel attribute allow hop-by-hop tracing through the core network. In some cases, the core network can be different than the other network (e.g., a border gateway protocol (BGP) network) and the PMSI tunnel does not account for various configuration, such as collecting the labeled static information in the core network.

Example Embodiments

FIG. 1 illustrates an example of a multicast network 100 that includes a source device 102 that is configured to transmit data to a first receiving device 140, a second receiving device 150, and a third receiving device 160. Multicast is group communication where data transmission is addressed to a group of destination computers simultaneously and can be one-to-many or many-to-many distribution, which increases network efficiency.

For example, a packet that is transmitted to the first receiving device 140, the second receiving device 150, and the third receiving device 160 can be transmitted through various combinations of network nodes 104, 106, 108, 112, 114, 116, 122, 124, and 126. In one example, a single packet can be transmitted to node 106, which provides the single packet to node 114. The node 114 can determine that the packet must be transmitted to node 122 through transmission to the first receiving device 140 via node 132. Similarly, the node 114 also transmits the packet to second receiving device 150 via node 134, and third receiving device 160 via node 136. In the event a receiving device fails to deliver the packet, for example, due to a link failure, conventional path tracing cannot be used to identify the path through the multicast network 100 to identify a link failure or a configuration failure.

Figure 2:
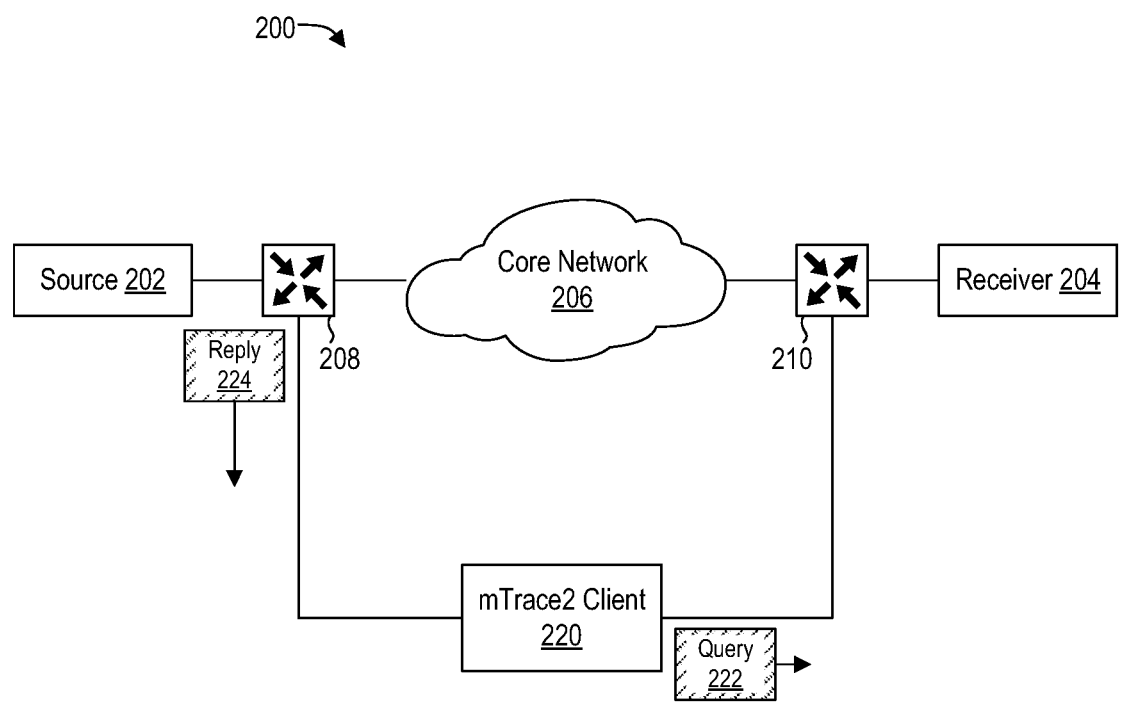
FIG. 2 illustrates an example of a multicast tracing (mtrace) configuration that can be used to trace network paths through a multicast network.

FIG. 2 illustrates an example of a multicast tracing (mtrace) configuration that can be used to trace network paths through a multicast network. The multicast network 200 includes a source device 202 that is configured to transmit multicast data to a receiver device through a core network 206. For example, the source device 202 transmits data to an edge device 208 that interfaces with the core network 206, and is received at an edge device 210 where the data is then provided to the network nodes 204.

The base multicast can travel up the tree hop-by-hop from network nodes 204 towards the source device 202, which verifies the basic multicast state back to the source device 202, but is not sufficient to verify the mVPN state. The base mtrace specification assumes that the network nodes (e.g., routers) in the path are directly connected through interfaces. In the case of Multicast traffic over VPN service, the provider edges (PEs) that are mVPN neighbors may be separated by several router hops. The path taken by the mtrace command can be completely different from the path taken through core by the actual multicast traffic.

In the mtrace2, an mtrace2 client 220 initiates a query 222 that is sent to the last hop router or the edge device 210 in this example. The edge device 210 converts the query 222 into an mtrace request message and sends it to the first hop router (e.g., the edge device 208). The edge device 208 sends the mtrace request message back to the edge device 210, and the edge device 210 changes the mtrace request message into a reply 224 that is then sent back to the mtrace2 client 220. If there is any error encountered by the edge device 210 or the edge device 208, a response is directly unicasted to the mtrace2 client 220 with appropriate mVPN specific error codes added. Each hop in the path of mtrace decrements the time to live (TTL) value before sending the mtrace message.

However, the mtrace2 client 220 and various proposals related to the PMSI tunnel attribute do not address existing solutions, such as how a multicast trace will work for a multiprotocol label switching (MPLS) network (e.g., Multicast Label Distribution Protocol (mLDP) inband). Another deficiency in the PMSI tunnel is information collecting the core network will be resolved, such as whether the core network provider will allow collection of proprietary data. Further, mtrace2 does not consider how multicast trace operates in a hybrid network, such as a BGP protocol network of a customer, to a PE, to a service provider MPLS network, to another PE, and to another BGP customer network. In the case of a hybrid network, the mtrace2 does not consider any translation between different procedures.

Figure 3:
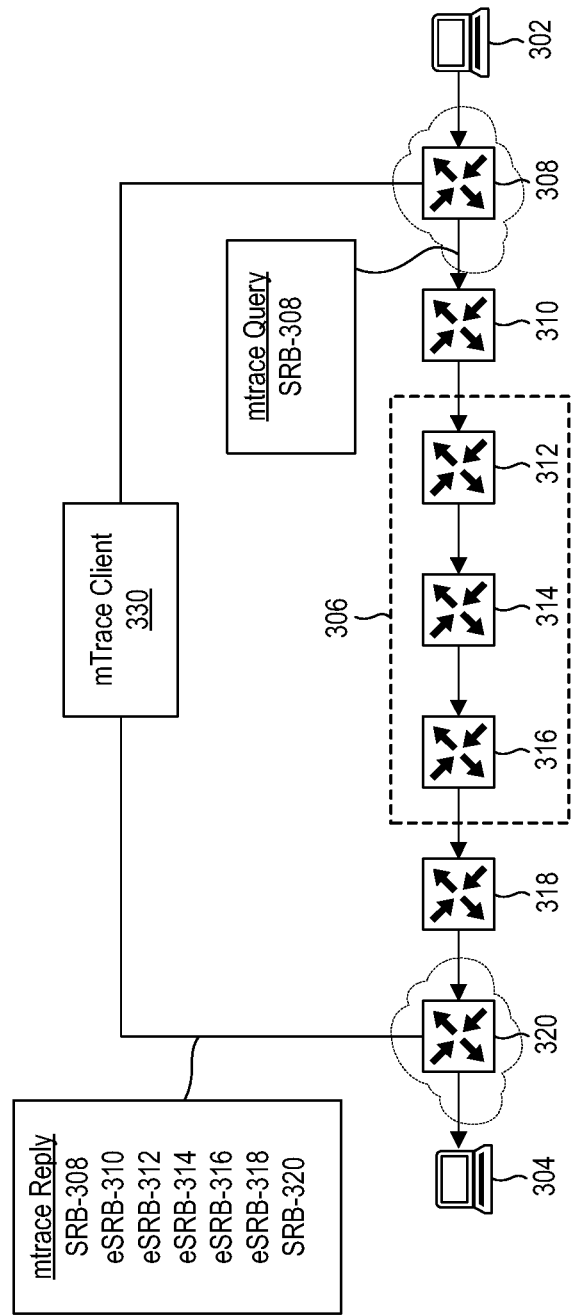
FIG. 3 illustrates an example configuration of a multicast tracing capable across heterogeneous networks in accordance with some aspects of the disclosure.

FIG. 3 illustrates an example configuration of a multicast tracing capable across heterogeneous networks in accordance with some aspects of the disclosure. Although the multicast tracing is capable of heterogenous networks, the multicast tracing can be applied to homogenous networks. In one illustrative aspect, a source device 302 is configured to transmit data to a receiver device 304 through a core network 306. The source device 302 interfaces with a first network 308, which provides the data to an edge device 310 of the core network 306. In some aspects, the first network 308 is a BGP network, and the core network 306 is another type of network such as a MPLS network, a segment routed (SR) network, etc. The core network 306 includes a first network node 312, a second network node 314, and a third network node 316 that form a path from the edge device 310 to an egress node such as the edge device 318 that interfaces with a second network 320. For illustrative purposes, the edge device 310 and the edge device 318 are presumed to be BGP, but other network configurations are possible.

An mtrace client 330 is configured to provide a multicast trace (mtrace) query (not shown) to a first hop router of either the first network 308 or the second network 320 to perform multicast path tracing from a first network node (e.g., a first hop router) to a last network node (e.g., a last hop router). For purposes of illustration, a first hop of the first network 308 is presumed to receive an mtrace query from the mtrace client 330 for sending the mtrace query to the receiver device 304 for identification of the multicast path and network performance information. For example, the first hop of the first network 308 can insert a standard resource block (SRB) into the mtrace query that includes various information, such as query arrival time (e.g., the time that the mtrace query was received), an incoming interface address, an outgoing interface address, and other information. The SRB identifies various information that can be used to ascertain network performance to identify network configuration issues. An example of an SRB is further illustrated herein with reference to FIG. 4. In some aspects, each network node can be configured to insert an SRB into the mtrace query and the SRBs within the mtrace query are denoted as an array. For example, the first network 308 inserts the first SRB and has an SRB payload of [SRB-308].

The edge device 310 is configured to intercept the mtrace query because the core network 306 is an MPLS network and cannot send the mtrace query used in the first network 308. The edge device 310 generates a different mtrace query for transmission through the MPLS network. In this case, the edge device 310 uses the data in the mtrace query to generate the different mtrace query and appends information related to the network performance of the edge device 310 onto the different mtrace query. For example, the edge device 310 appends an extended SRB (eSRB) and the SRB payload includes [SRB-308, eSRB-310]. More details regarding the eSRB are further described below with reference to Table 1.

In some aspects, the edge device 310 is configured to identify a format of the mtrace query based on the network configuration of the first network 308 and then generate a new mtrace query that can be provided into a different network, such as an MPLS network. Information from the original mtrace can be persisted, such as a TTL when generating the mtrace query for the MPLS network. For example, the edge device 310 generates the mtrace query based on mLDP inband semantics and includes context for the virtual routing and forwarding (VRF), which enables multiple instances of a routing table to exist in a virtual router and work simultaneously. The mtrace query generated by the edge device 310 can also include context for customer C (S,G).

In some aspects, the edge device 310 may use a different SRB format or an eSRB based on the different properties of the MPLS network. For example, routing in an MPLS network is achieved based on a label distribution protocol (LDP) protocol and includes a VRF context for the multicast. Table 1 below illustrates various fields that can be included in an eSRB field.

TABLE 1 eSRB fields

| Field | Description |
| --- | --- |
| C(S, G) | Custom information associated with the multicast (S, G), where S and G are the source and destination IP addresses of the data packets. In some aspects, this is a multicast IP address, representing a group of hosts (receivers) interested in receiving the traffic. |
| VRF context | VRF context associated with a network (e.g., border gateway protocol (BGP), MPLS, generic route encapsulation (GRE), etc. |
| mLDP FEC for core tree | Forward error correction of MLPS network |
| Query arrival time | Time of arrival of the mtrace query |
| Incoming interface detail | Identifier of the incoming network node interface |
| Outgoing interface detail | Identifier of the outgoing network node interface |
| Upstream router address | Identifier of the network node that provided the mtrace query |
| Incoming label counter | Incoming packet counter per label |
| Outgoing label counter | Outgoing packet counter per label |
| Traffic rate | Traffic rate over a period of time |

The edge device 310 may send the mtrace query into the core network and will include a payload with the SRB associated with the first network 308 and the eSRB associated with the edge device 310. That is, the mtrace query includes [SRB-308, eSRB-310]. Based on the SRB data encoded in the mtrace query, a device can access and determine network performance information between the first network 308 and the edge device 310.

The first network node 312 in the core network 306 receives the mtrace query, appends an additional eSRB [SRB-308, eSRB-310, eSRB-312], and then forward the mtrace query to the second network node 314. This process continues until the mtrace query is received by the edge device 318 and the mtrace query will include [SRB-308, eSRB-310, eSRB-312, cSRB-314, eSRB-316]. In some aspects, the edge device 318 is configured to intercept the mtrace query and generate a new mtrace query for transmission into the second network 320. For example, the second network 320 may be an IP network that uses BGP, and the edge device 318 generates a new mtrace query that comports with the second network 320. In one illustrative aspect, the edge device 318 may be configured to interface with different network configurations and determines the network type, and generates an mtrace query that comports with the second network 320. The mtrace query generated by the edge device 318 includes the appended eSRB associated with the edge device 318 (e.g., [SRB-308, eSRB-310, eSRB-312, cSRB-314, cSRB-316, eSRB-318]).

Figure 5:
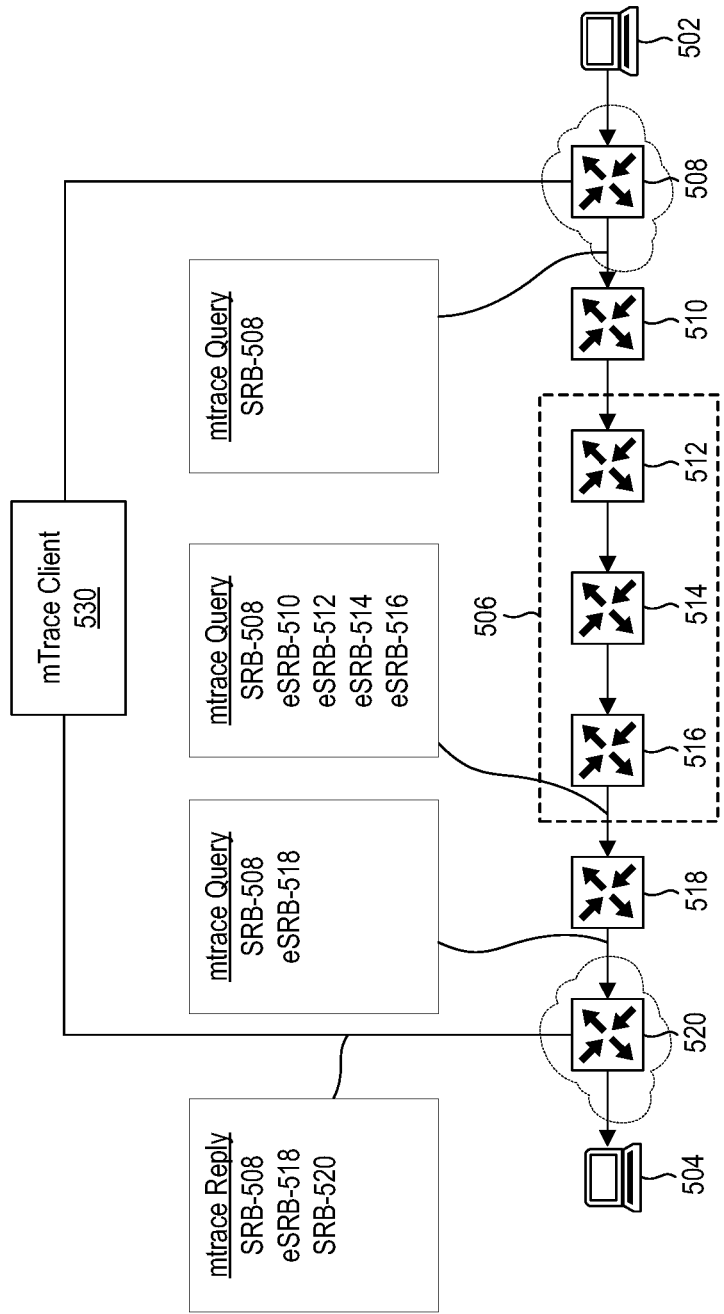
FIG. 5 illustrates an example configuration of a multicast tracing capable across heterogeneous networks in accordance with some aspects of the disclosure.

In this illustrative example, the core network 306 allows the edge device 318 to provide network information related to its internal network (e.g., eSRB-310, eSRB-312, cSRB-314, cSRB-316, eSRB-318). For example, the second network 320 and the core network 306 may be operated by the same vendor and the network information within the mtrace query may be shared. As further described below with reference to FIG. 5, the core network 306 may be configured to remove the network information related to its internal network (e.g., eSRB-310, cSRB-312, cSRB-314, eSRB-316, eSRB-318) and generate a summary eSRB that provides core network information that does not expose any proprietary internal network information. For example, the second network 320 and the core network 306 may be different network providers and the core network 306 desires to keep proprietary network information secure. FIG. 5 below describes an example in which a core network removes internal network information from the mtrace query.

The edge device 318 provides the mtrace query for the second network 320, which appends an SRB at each hop (e.g., [SRB-308, eSRB-310, eSRB-312, eSRB-314, eSRB-316, cSRB-318, SRB-320])]. Although only one network node is illustrated in the second network 320, the second network 320 can include multiple network nodes for transmission of the mtrace query. The last hop router is configured to provide a mtrace reply to the mtrace client 330 with network information between the first hop router (e.g., the first network 308) and the last hop router (e.g., the last hop router within the second network 320). In some aspects, the edge routers (e.g., the edge device 310 and the edge device 318) are configured to convert the mtrace query into a corresponding format to ensure the multicast tracing request can be completed and proprietary information can be contained by the core network provider.

Figure 4:
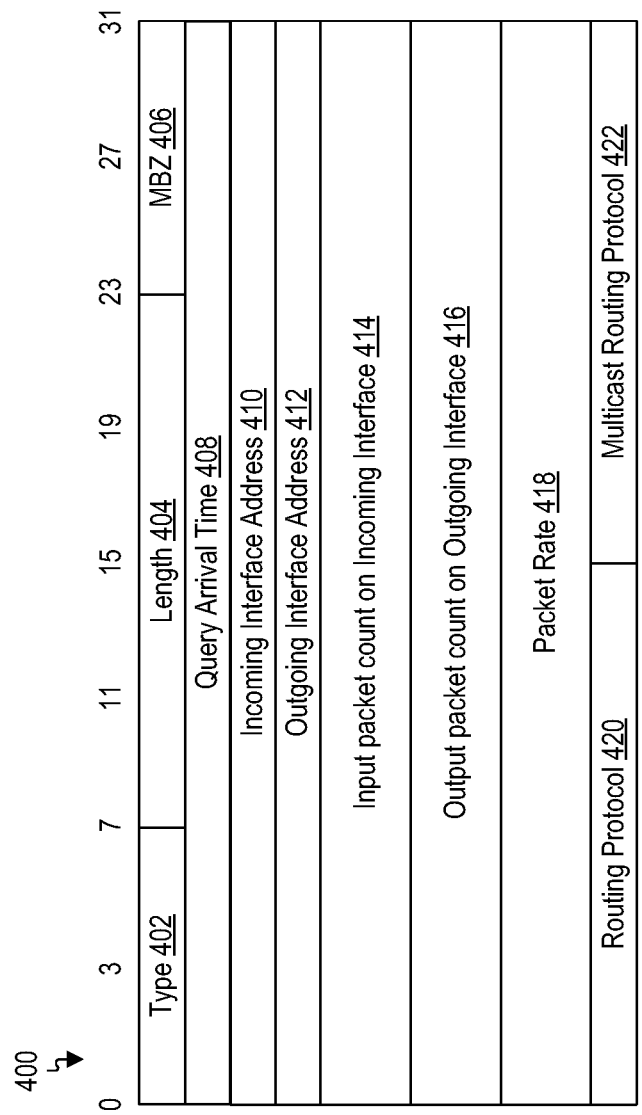
FIG. 4 illustrates an example of an standard resource block (SRB) that can be used in various network configurations.

FIG. 4 illustrates an example of an SRB 400 that can be used in various network configurations. The SRB 400 can be inserted into a packet (e.g., an mtrace query) upon reception of the packet. For example, the SRB 400 can include a type field 402, a length field 404, a must be zero (MBZ) field 406, a query arrival time 408 (e.g., a timestamp that identifies the arrival of the packet), an incoming interface address 410 associated with the network node, and outgoing interface address 412 associated with the network node, an input packet count on the incoming interface 414, an output packet count of the outgoing interface 416, a packet rate 418 that identifies a packet rate of the network node over a period of time (e.g., five seconds), an identifier associated with the routing protocol 420, and an identifier associated with the multicast routing protocol 422. In some aspects, the information encoded in the SRB can be used to identify network issues, such as a misconfiguration of a network node.

In the illustrative aspect of FIG. 4, the SRB 400 is configured to operate in a protocol independent multicast (PIM) in, for example, a BGP network but does not work in a different type of network, such as an MPLS network. As noted above with reference to Table 1, the semantics associated with an MPLS network are different than a BGP network and the mtrace query is intercepted and translated between the different networks.

FIG. 5 illustrates an example configuration of a multicast tracing capable across heterogeneous networks in accordance with some aspects of the disclosure. Although the multicast tracing is capable of heterogenous networks, the multicast tracing can be applied to homogenous networks. In one illustrative aspect, a source device 502 is configured to transmit data to a receiver device 504 through a core network 506. The source device 502 interfaces with a first network 508, which provides the data to an edge device 510 of the core network 506. In some aspects, the first network 508 is a PIM network, and the core network 506 is another type of network such as an MPLS network, a segment routed (SR) network, etc. The core network 506 includes a first network node 512, a second network node 514, and a third network node 516 that form a path from the edge device 510 to an egress node such as the edge device 518 that interfaces with a second network 520. For illustrative purposes, the edge device 510 and the edge device 510 are presumed to be PIM, but other network configurations are possible.

Similar to FIG. 3, the various network nodes are configured to append network information, such as an SRB or an eSRB, to the mtrace query. For example, a first network node (e.g., a first hop router) in a first network 508 is configured to append its SRB and the mtrace query has a payload of [SRB-508]. The edge device 510 intercepts the mtrace query and generates a mtrace query that corresponds to the core network 506. The mtrace query is passed through the core network 506 and an edge device 518 (e.g., an egress node of the core network 506) is configured to intercept the mtrace query and generate another mtrace query that corresponds to a second network 520.

In this illustrative aspect, the edge device 518 may also be configured to remove network information (e.g., an SRB or an eSRB) associated with the core network 506. For example, the SRB or the eSRB can include unique identifying information that can reveal proprietary information of the core network 506. The edge device 518 is configured to remove SRBs and/or eSRBs from the mtrace query. In the example of FIG. 5, the eSRBs of nodes within the core network 506 (e.g., [cSRB-512, cSRB-514, eSRB-516]) can be removed to prevent leakage of any proprietary information.

The last hop router associated with the second network 520 sends an mtrace reply to the mtrace client 530, which is then able to provide the results of the multicast path tracing to the requesting party.

Figure 6:
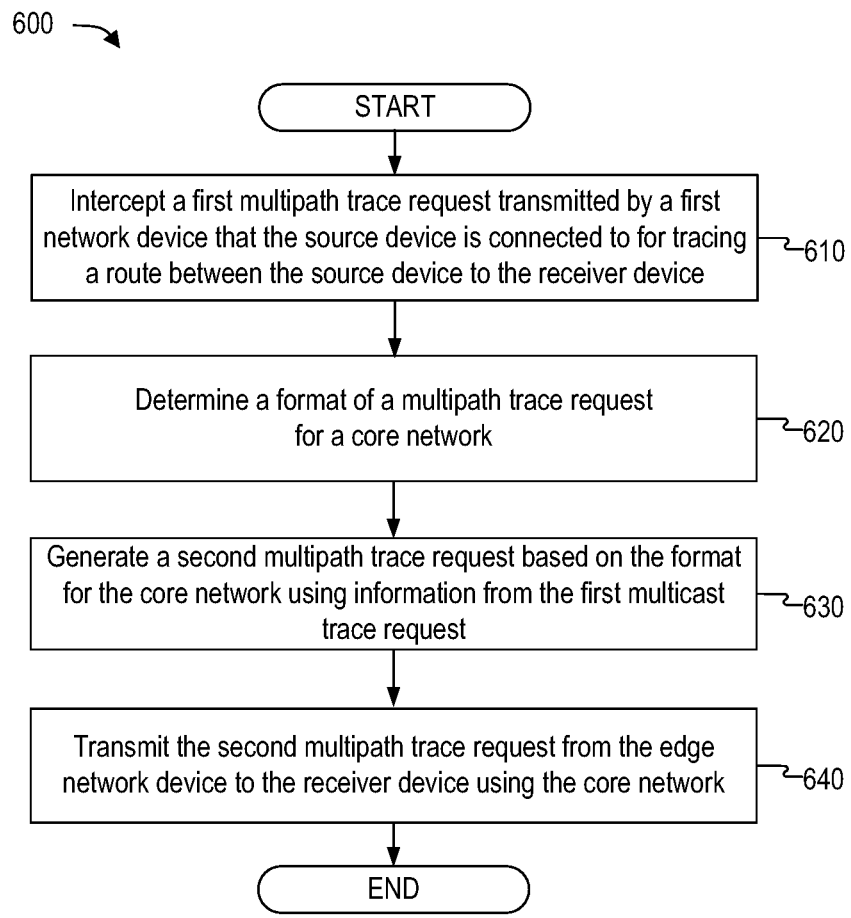
FIG. 6 illustrates an example method that can be performed by an ingress edge device of a core network in accordance with some aspects of the disclosure.

FIG. 6 illustrates an example method 600 that can be performed by an ingress edge device of a core network in accordance with some aspects of the disclosure. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method includes intercepting (e.g., by the edge device 310) a first multicast trace request transmitted by a first network device that the source device is connected to for tracing a route between the source device to the receiver device at block 610. The first network device may be a first hop device that receives a message from a multicast tracing client to trace a multicast path from a receiver device to a source device. In some aspects, the first network device may be connected to the source device.

According to some examples, the method includes determining (e.g., by the edge device 310) a format of a multicast trace request for a core network at block 620. In one illustrative example, the core network comprises an MPLS network, and the network associated with the source device and the receiver device may be able to use a PIM for transmission or reception. In some aspects, devices associated with the MPLS network, which includes the edge network device and the egress network device, may be configured to insert an extended standard resource block (eSRB) into multicast tracing requests.

According to some examples, the method includes generating (e.g., by the edge device 310) a second multicast trace request based on the format for the core network using information from the first multicast trace request at block 630. As described above, the edge device 310 may be configured to convert the mtrace request into a form suitable for the MPLS network.

According to some examples, the method includes transmitting (e.g., by the edge device 310) the second multicast trace request from the edge network device to the receiver device using the core network at block 640. In some aspects, the egress edge network device of the core network (e.g., the edge device 318) is configured to determine whether to remove network information from the third multicast trace request. In particular, the egress edge network device is configured to remove network information associated with network devices between the edge network device and the egress edge network device, thereby removing proprietary information related to the internal configuration of the core network (e.g., the core network 306). The mtrace reply may include network information related to devices between the first network device and the edge network device and devices between the egress edge network device and the last network device. The second multicast trace request includes network information related to network performance between the first network node and the edge network device. An egress edge network device associated with the core network is configured to intercept the second multicast trace request and generate a third multicast trace request for transmission to a network including a last network device connected to the receiver device. The last network device is configured to send an mtrace reply to the multicast tracing client.

Figure 7:
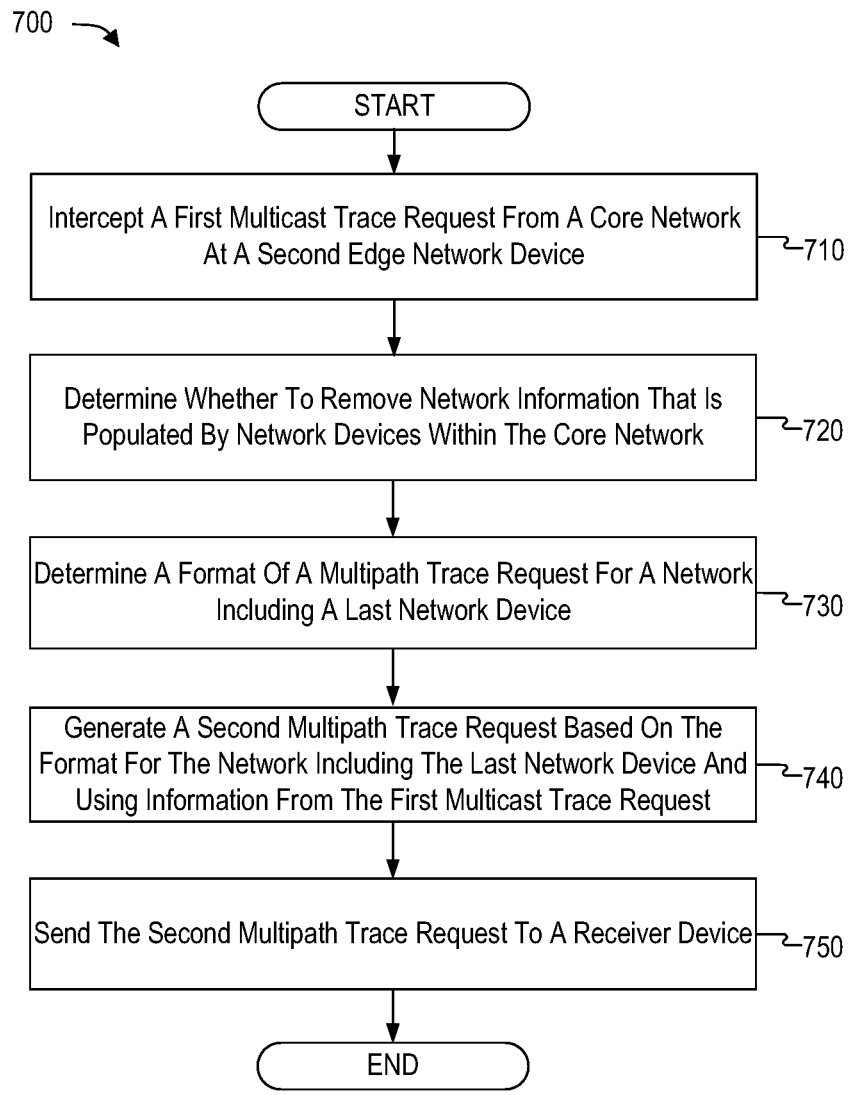
FIG. 7 illustrates an example method that can be performed by an egress edge device of a core network in accordance with some aspects of the disclosure.

FIG. 7 illustrates an example method 700 that can be performed by an egress edge device of a core network in accordance with some aspects of the disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method includes intercepting (e.g., by the edge device 318) a first multicast trace request from a core network (e.g., the core network 306) at a second edge network device at block 710. For example, a first network device receives a message from a multicast tracing client to trace a multicast path from a receiver device to a source device, which transmits a previous multicast trace request. An ingress edge network device associated with the core network is configured to intercept the previous multicast trace request and generate the first multicast trace request for transmission into the core network. The first multicast trace request includes network information that is populated by network devices within the core network and network devices between a first network device and an ingress edge network device. In some aspects, the core network comprises an MPLS network. Devices associated with the MPLS network including the edge network device and the egress network device insert an extended standard resource block (eSRB) into multicast tracing requests.

According to some examples, the method includes determining (e.g., by the edge device 318) whether to remove network information that is populated by network devices within the core network at block 720. For example, determining whether to remove the network information that is populated by network devices within the core network is based on a setting of the edge network device. In some cases, determining whether to remove the network information occurs at runtime (e.g., when the packet is received), and in other cases at design time (e.g., during configuration of the network devices).

According to some examples, the method includes determining (e.g., by the edge device 318) a format of a multicast trace request for a network including a last network device at block 730. In this case, the receiver device is connected to the last network device. The determining of the format can occur at runtime or a design time.

According to some examples, the method includes generating (e.g., by the edge device 318) a second multicast trace request based on the format for the network including the last network device, and using information from the first multicast trace request at block 740.

According to some examples, the method includes sending (e.g., by the edge device 318) the second multicast trace request to the receiver device for tracing the route between the receiver device to the source device at block 750. The last network device (e.g., the second network 320) may be a last hop router, and generates a multicast trace reply. The multicast trace reply is sent to the mtrace client and includes network information related to devices between the first network device and the edge network device and devices between the egress edge network device and the last network device. The last network device is configured to receive the second trace request and send a multicast trace reply to the multicast trace client.

Figure 8:
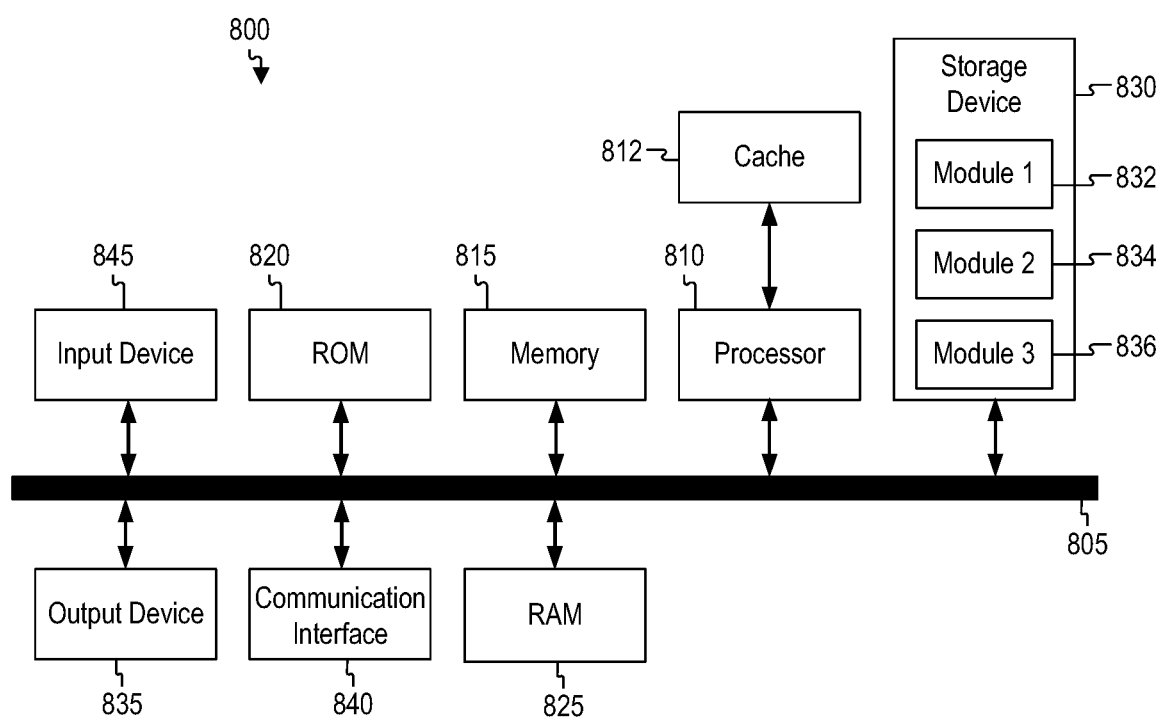
FIG. 8 shows an example of computing system, which can be for example any computing device that can implement components of the system.

FIG. 8 shows an example of computing system 800, which can be for example any computing device making up the various roles described above (e.g., the edge device 310, the edge device 318) or any component thereof in which the components of the system are in communication with each other using connection 805. Connection 805 can be a physical connection via a bus, or a direct connection to processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 9:
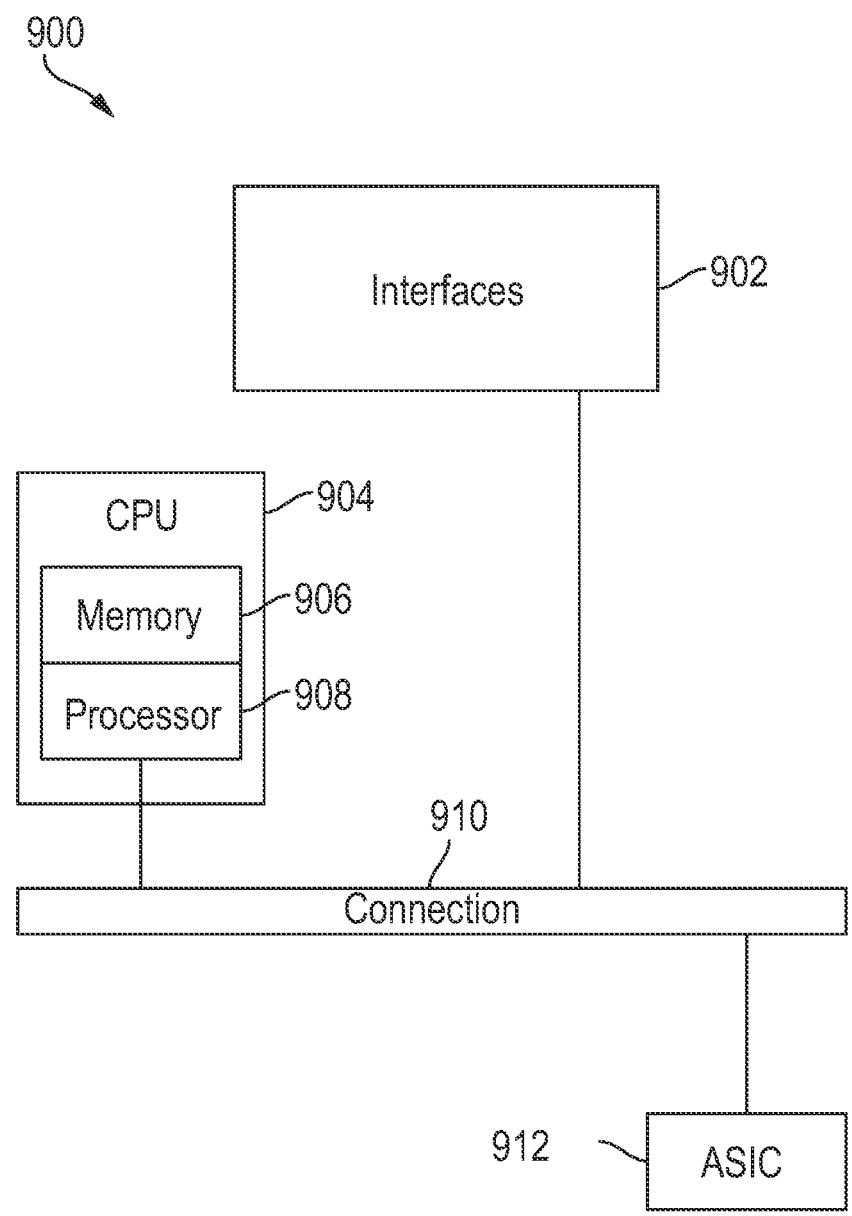
FIG. 9 illustrates an example network device in accordance with some examples of the disclosure.

FIG. 9 illustrates an example network device 900 suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, asynchronous transfer mode (ATM) interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC 912 can communicate with other components in the network device 900 via the bus 910, to exchange data and signals and coordinate various types of operations by the network device 900, such as routing, switching, and/or data storage operations, for example.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method, comprising: intercepting a first multicast trace request transmitted by a first network device that a source device is connected to for tracing a route between the source device to a receiver device, wherein the first network device receives a message from a multicast tracing client to trace a multicast path from the receiver device to the source device; generating a second multicast trace request based on the format for the core network using information from the first multicast trace request; and transmitting the second multicast trace request from an edge network device to the receiver device using the core network, the second multicast trace request including network information related to network performance between the first network device and the edge network device.

Aspect 2. The method of Aspect 1, wherein an egress edge network device associated with the core network is configured to intercept the second multicast trace request and generate a third multicast trace request for transmission to a network including a last network device connected to the receiver device.

Aspect 3. The method of any of Aspects 1 to 2, wherein the egress edge network device is configured to determine whether to remove network information from the third multicast trace request.

Aspect 4. The method of any of Aspects 1 to 3, wherein the egress edge network device is configured to remove network information associated with network devices between the edge network device and the egress edge network device.

Aspect 5. The method of any of Aspects 1 to 4, wherein the last network device is configured to send an mtrace reply to the multicast tracing client, wherein the mtrace reply include network information related to devices between the first network device and the edge network device and devices between the egress edge network device and the last network device.

Aspect 6. The method of any of Aspects 1 to 5, wherein the core network comprises a multiprotocol label switching (MPLS) network.

Aspect 7. The method of any of Aspects 1 to 6, wherein devices associated with the MPLS network including the edge network device and the egress network device insert an extended standard resource block (eSRB) into multicast tracing requests.

Aspect 8. The method of any of Aspects 1 to 7, wherein the first network device and the second network device are associated with a multicast virtual private network (mVPN).

Aspect 9. The method of any of Aspects 1 to 8, wherein the source device and the receiver device are associated with the mVPN.

Aspect 10. A method of analyzing a multicast network, comprising: intercepting a first multicast trace request from a core network at a second edge network device, wherein the first multicast trace request includes network information that is populated by network devices within the core network and network devices between a first network device a first edge network device, and wherein the first network device receives a message from a multicast tracing client to trace a multicast path from a receiver device to a source device; determining whether to remove network information that is populated by network devices within the core network; generating a second multicast trace request based on the format for the network including the last network device and using information from the first multicast trace request; and sending the second multicast trace request to the receiver device for tracing the route between the receiver device to the source device.

Aspect 11. The method of Aspect 10, wherein an ingress edge network device associated with the core network is configured to intercept a previous multicast trace request and generate the first multicast trace request for transmission into the core network.

Aspect 12. The method of any of Aspects 10 to 11, wherein determining whether to remove the network information that is populated by network devices within the core network is based on a setting of the edge network device.

Aspect 13. The method of any of Aspects 10 to 12, wherein the last network device is configured to receive the second multicast trace request and send a multicast trace reply to the multicast trace client.

Aspect 14. The method of any of Aspects 10 to 13, wherein the multicast trace reply includes network information related to devices between the first network device and the edge network device and devices between an egress edge network device and the last network device.

Aspect 15. The method of any of Aspects 10 to 14, wherein the core network comprises a multiprotocol label switching (MPLS) network.

Aspect 16. The method of any of Aspects 10 to 15, wherein devices associated with the MPLS network including the edge network device and the egress network device insert an extended standard resource block (eSRB) into multicast tracing requests.

Aspect 17. The method of any of Aspects 10 to 16, wherein the first network device and the second network device are associated with a multicast virtual private network (mVPN).

Aspect 18. The method of any of Aspects 10 to 17, wherein the source device and the receiver device are associated with the mVPN.

Aspect 19. A network device includes a storage (implemented in circuitry) configured to store instructions and a processor. The processor configured to execute the instructions and cause the processor to: intercept a first multicast trace request transmitted by a first network device that a source device is connected to for tracing a route between the source device to a receiver device, wherein the first network device receives a message from a multicast tracing client to trace a multicast path from the receiver device to the source device; generate a second multicast trace request based on the format for the core network using information from the first multicast trace request; and transmit the second multicast trace request from an edge network device to the receiver device using the core network, the second multicast trace request including network information related to network performance between the first network device and the edge network device.

Aspect 20. The network device of Aspect 19, wherein an egress edge network device associated with the core network is configured to intercept the second multicast trace request and generate a third multicast trace request for transmission to a network including a last network device connected to the receiver device.

Aspect 21. The network device of any of Aspects 19 to 20, wherein the egress edge network device is configured to determine whether to remove network information from the third multicast trace request.

Aspect 22. The network device of any of Aspects 19 to 21, wherein the egress edge network device is configured to remove network information associated with network devices between the edge network device and the egress edge network device.

Aspect 23. The network device of any of Aspects 19 to 22, wherein the last network device is configured to send an mtrace reply to the multicast tracing client, wherein the mtrace reply include network information related to devices between the first network device and the edge network device and devices between the egress edge network device and the last network device.

Aspect 24. The network device of any of Aspects 19 to 23, wherein the core network comprises a multiprotocol label switching (MPLS) network.

Aspect 25. The network device of any of Aspects 19 to 24, wherein devices associated with the MPLS network including the edge network device and the egress network device insert an extended standard resource block (eSRB) into multicast tracing requests.

Aspect 26. The network device of any of Aspects 19 to 25, wherein the first network device and the second network device are associated with a multicast virtual private network (mVPN).

Aspect 27. The network device of any of Aspects 19 to 26, wherein the source device and the receiver device are associated with the mVPN.

Aspect 29. A non-transitory computer-readable medium having stored thereon instructions that, when executed by one or more processors, cause the one or more processors to perform operations according to any of Aspects 1 to 9.

Aspect 32. An apparatus for processing one or more images including one or more means for performing operations according to any of Aspects 1 to 9.

What is claimed is:

1. A method, comprising:
   intercepting a first multicast trace request transmitted by a first network device that a source device is connected to for tracing a route between the source device to a receiver device, wherein the first network device receives a message from a multicast tracing client to trace a multicast path from the receiver device to the source device;
   after the first multicast trace request has been intercepted, generating a second multicast trace request, wherein the second multicast trace request is generated using information from the first multicast trace request and based on the format for the core network; and
   transmitting the second multicast trace request from an edge network device to the receiver device using the core network, the second multicast trace request including network information related to network performance between the first network device and the edge network device.

2. The method of claim 1, wherein an egress edge network device associated with the core network is configured to intercept the second multicast trace request and generate a third multicast trace request for transmission to a network including a last network device connected to the receiver device.

3. The method of claim 2, wherein the egress edge network device is configured to determine whether to remove network information from the third multicast trace request.

4. The method of claim 3, wherein the egress edge network device is configured to remove network information associated with network devices between the edge network device and the egress edge network device.

5. The method of claim 4, wherein the last network device is configured to send an mtrace reply to the multicast tracing client, wherein the mtrace reply include network information related to devices between the first network device and the edge network device and devices between the egress edge network device and the last network device.

6. The method of claim 1, wherein the core network comprises a multiprotocol label switching (MPLS) network.

7. The method of claim 6, wherein devices associated with the MPLS network including the edge network device and the egress network device insert an extended standard resource block (eSRB) into multicast tracing requests.

8. The method of claim 1, wherein the first network device and the second network device are associated with a multicast virtual private network (mVPN).

9. The method of claim 8, wherein the source device and the receiver device are associated with the mVPN.

10. A method of analyzing a multicast network, comprising:
   intercepting a first multicast trace request from a core network at a second edge network device, wherein the first multicast trace request includes network information that is populated by network devices within the core network and network devices between a first network device a first edge network device, and wherein the first network device receives a message from a multicast tracing client to trace a multicast path from a receiver device to a source device;
   determining whether to remove network information that is populated by network devices within the core network;
   after the first multicast trace request has been intercepted, generating a second multicast trace request, wherein the second multicast trace request is generated using information from the first multicast trace request and based on the format for the network including the last network device; and
   sending the second multicast trace request to the receiver device for tracing the route between the receiver device to the source device.

11. The method of claim 10, wherein an ingress edge network device associated with the core network is configured to intercept a previous multicast trace request and generate the first multicast trace request for transmission into the core network.

12. The method of claim 10, wherein determining whether to remove the network information that is populated by network devices within the core network is based on a setting of the edge network device.

13. The method of claim 10, wherein the last network device is configured to receive the second multicast trace request and send a multicast trace reply to the multicast trace client.

14. The method of claim 13, wherein the multicast trace reply includes network information related to devices between the first network device and the edge network device and devices between an egress edge network device and the last network device.

15. The method of claim 10, wherein the core network comprises a multiprotocol label switching (MPLS) network.

16. The method of claim 15, wherein devices associated with the MPLS network including the edge network device and the egress network device insert an extended standard resource block (eSRB) into multicast tracing requests.

17. The method of claim 10, wherein the first network device and the second network device are associated with a multicast virtual private network (mVPN).

18. The method of claim 17, wherein the source device and the receiver device are associated with the mVPN.

19. A network device comprising:
   a storage configured to store instructions;
   a processor configured to execute the instructions and cause the processor to:
      intercept a first multicast trace request transmitted by a first network device that a source device is connected to for tracing a route between the source device to a receiver device, wherein the first network device receives a message from a multicast tracing client to trace a multicast path from the receiver device to the source device;
      after the first multicast trace request has been intercepted, generate a second multicast trace request, wherein the second multicast trace request is generated using information from the first multicast trace request and based on the format for the core network; and
      transmit the second multicast trace request from an edge network device to the receiver device using the core network, the second multicast trace request including network information related to network performance between the first network device and the edge network device.

20. The network device of claim 19, wherein an egress edge network device associated with the core network is configured to intercept the second multicast trace request and generate a third multicast trace request for transmission to a network including a last network device connected to the receiver device.

* * * * *